Nov. 29, 1960 E. V. JAFFEE 2,961,923
SPECTACLE FRAME LENS CLAMP AND TEMPLE HINGE
Filed Sept. 13, 1957

INVENTOR
EUGENE V. JAFFEE
BY
Dean, Fairbanks & Hirsch
ATTORNEY

2,961,923

SPECTACLE FRAME LENS CLAMP AND TEMPLE HINGE

Eugene V. Jaffee, 19 E. 98th St., New York, N.Y.

Filed Sept. 13, 1957, Ser. No. 683,862

2 Claims (Cl. 88—53)

The present invention relates to spectacle frames, more especially to spectacle frames of metal, such as of anodized or gold, silver or chromium plated aluminum or aluminum alloy of relatively low elasticity.

As conducive to a clear understanding of the invention, it is noted that the use of a single pin through lugs on the lens frame portion and on the temple to perform the dual function of clamping the lens in its frame portion and affording the hinge mount for the temple, has the objection that the loosening or removal of the pin for taking off a temple, entails loosening if not release of the associated lens, or conversely such loosening to remove the lens may displace and thereby disturb the ease of hinging thereafter of the temple. At best the use of a single pin to serve both as the pivot for the temple and as the clamp for the lens in its split encompassing frame renders difficult the ideal performance of such pin for each of its dual purposes, necessitates tolerances in manufacture and skill in assembly that add to the cost of the frame and of repair service thereof, and moreover, results in a relatively weak assembly, inasmuch as the entire strain of both lens and temple is exerted on a single pin which will consequently tend to loosen in the frame during use.

It is accordingly an object of the invention to provide a spectacle frame, more particularly one of soft metal, in which replacement of either a lens or a temple may be effected without the least disturbance to or loosening, displacement or release of the other, in which the lens may be securely clamped in its holding frame portion, independently of the mounting and pivoting of the temple and conversely, in which the temple may be assembled in place, adjusted or replaced independently of the installation or replacement of the lens, and in which the installation or replacement of the lens may be effected more expeditiously, without the need for the skilled attention required where a single pin is to perform both the lens clamping and temple pivoting function.

Figure 1:
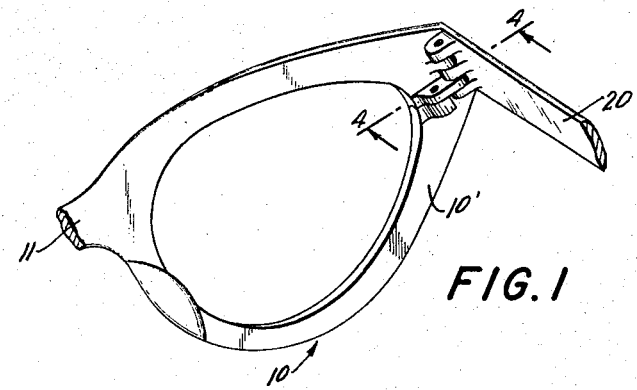
Figure 2:
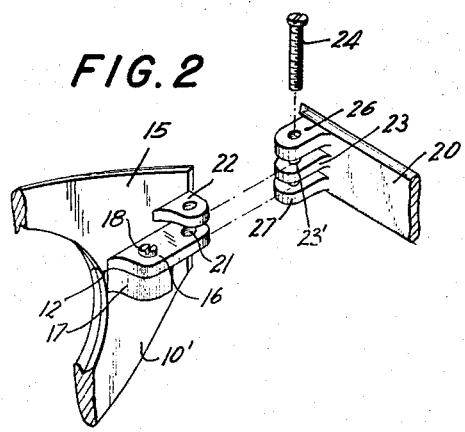
Figure 3:
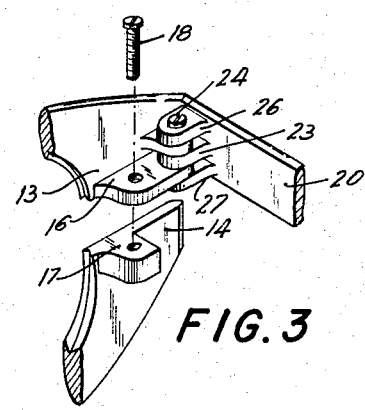
Figure 4:
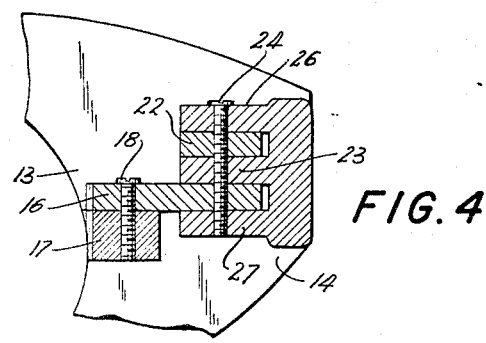

In the accompanying drawings in which is shown one of various possible embodiments of the several features of the invention, Fig. 1 is a fragmentary perspective view of the inner face of the lens frame with the temple assembled thereto, Fig. 2 is a similar fragmentary view showing the lens clamping relation, and the temple aligned with the frame preparatory to its assembly in place, Fig. 3 is a view similar to Fig. 2, showing the lens clamping frame portion in open position preparatory to installing the lens, but the temple assembled to the frame, and Fig. 4 is a transverse cross-section on a larger scale taken on line 4—4 of Fig. 1.

Referring now to the drawings, the metal frame comprises a pair of lens encompassing frame portions 10 with the usual bridge 11 connecting the same. The lens-encompassing frame portion is longitudinally slit at 12 at its outer portion to afford a pair of jaws 13 and 14 for facility in mounting the lens (not shown). Immediately above the slit portion, the lens-encompassing frame portion is widened as at 15 and the slot 12 which extends the entire width of said widened portion 15 is accordingly of considerably greater length than the width of stock of the main area of the frame.

Near the temple region of the lens encompassing frame portion 10', that frame portion is provided with a pair of lugs 16 and 17 which extend rearwardly from the frame portion substantially along and at opposite sides of the slit 12, that is lug 16 extends rearwardly from the upper jaw 13 of the lens encompassing frame portion and lug 17 from its lower jaw 14. Thus a clamping screw 18 through corresponding apertures in the lugs 16 and 17, serves to clamp the jaws 13 and 14 about the lens to retain it securely within its frame portion 10'. As shown in the drawings, lug 17, the only lug on the lower jaw 14 is preferably considerably thicker than lug 16 of the upper jaw 13 and jaw 22 to be referred to hereinafter.

Lug 16 at the upper jaw 13 of the slit frame portion 10' is preferably of width to extend substantially the entire length of the jaw 13 of the widened frame portion 15, the outer portion of said wide lug constituting a lug portion for the pivotal mounting of the temple 20, for which purpose said lug portion has a pin holding aperture 21 and extending rearward from the same upper jaw 13 as the longer lug 16, is a second pivot pin holding lug 22, spaced from and parallel to lug 16.

The temple has a pivot lug 23 perforated at 23', to be introduced in assembly between the lugs 16 and 22 of the frame element 10' so that a pivot pin 24 through said lugs 22, 23 and 16 will afford the pivot mount for the temple. However, it is preferred to provide the temple not only with the lug 23 but with two outer lugs 26 and 27, as well, the latter to straddle between them the lugs 16 and 22 of the frame element 10'. The pivot pin 24 thus extends through corresponding apertures in the three lugs 23, 26 and 27 of the temple and the two lugs 16 and 22 of the frame, which extend into the intervals between said temple lugs.

The temple is thus mounted entirely in the upper jaw 13 of the frame, so that the pivot mounting of the temple or the repeated hinging movement of the temple in use, does not in the slightest affect the tighness of the lens mount. The clamp screw 18 on the other hand, serves effectively to close the jaws 13 and 14 of the lens clamping frame portion and in no wise affects the security or accuracy of mount of the temple.

The preferred structure in which there is used a unitary or integral lug 16 at the upper jaw of the lens frame portion, with its two apertures, the inner one for accommodating the clamp screw 18 and the outer for accommodating the temple hinging screw 24, affords added stiffness to the frame, facilitates the accuracy of alignment and contributes to the general ruggedness of the structure.

It will be seen that the spectacle frame of the present invention admits readily of introducing a lens in original fitting or in removing a lens for replacement, without interfering in the least with the accurate positioning or free hinging movement of the temple. For the tightening or loosening of the clamp screw 18 by which the lens is clamped in its socket or removed, as the case may be, does not in the least interfere with the accuracy of mounting or freedom of pivoting of the temple which is mounted solely on the upper jaw 13 of the lens encompassing frame portion, independently of the lens clamping screw 18.

Similarly where the temple is to be removed as for replacement, the operation of removal and replacement involves merely the removal or application of the pivot screw 24, which occurs entirely at lugs 16 and 22 in the upper jaw 13 of the frame and does not and cannot interfere in the slightest with the tightness or effectiveness of the clamping by screw 18 of the lens in its encompassing frame portion.

While the invention is applicable to metal frames generally, it has especial utility with the widely used anodized or metal plated aluminum frames.

As many changes could be made in the above construction and many apparently widely different embodiments of this invention could be made without departing from the scope of the claims, it is intended that all matter contained in the above description, or shown in the accompanying drawings, shall be interpreted as illustrative and not in a limiting sense.

Having thus described my invention, what I claim as new and desire to secure by Letters Patent of the United States is:

1. A spectacle frame having a pair of lens frame portions each with a lens opening therein, and temples pivoted to the outer parts of said frame portions, each lens frame portion having in substantially the same plane therewith a wide outer portion that is slit longitudinally of the frame, affording a pair of jaws, a pair of lens clamping screw holding lug means extending perpendicularly rearward from the rear face of said outer frame portion adjacent to, along and at opposite sides of said slit of each lens frame portion and integral therewith for accommodating a screw to maintain said jaws in lens clamping position, each lens frame portion having a first temple pivot mounting lug means integral with, adjacent to and along the slit nearer the outer part of the wide outer frame portion than the lens clamping screw holding lug means, said temple pivot mounting lug means extending perpendicularly rearward from the rear face of said outer portion of the frame and being in line with one of the lens clamping screw holding lug means, a second temple pivot mounting lug extending perpendicularly rearward from the rear face of one and the same jaw of the lens frame portion as does the first temple pivot mounting means, integral with said frame and in parallel relation to said first temple pivot mounting lug, said temples each having at least one lug integral therewith extending between the corresponding pair of temple pivot mounting lugs and a pivot screw through each pair of said pivot lugs for assembling the temples to the frame.

2. A metal spectacle frame as claimed in claim 1 in which one of the clamping screw holding lug means and the first temple pivot mounting lug means extend as one unitary lug of width nearly the full length of the slit, wherein each of the temples has three hinge lugs integral therewith, the middle lug being accommodated between the pivot mounting lugs and the two outer lugs straddling said pivot mounting lugs.

References Cited in the file of this patent

UNITED STATES PATENTS

| | | |
|---|---|---|
| 1,609,871 | Gage | Dec. 7, 1926 |
| 1,706,343 | Beattey | Mar. 19, 1929 |
| 1,844,143 | Bouchard | Feb. 9, 1932 |
| 1,953,922 | Bosworth | Apr. 10, 1934 |
| 2,614,459 | Ditto | Oct. 21, 1952 |
| 2,727,436 | Prince | Dec. 20, 1955 |

FOREIGN PATENTS

| | | |
|---|---|---|
| 1,008,750 | France | Feb. 27, 1952 |